United States Patent
Cueman et al.

(10) Patent No.: US 8,136,767 B2
(45) Date of Patent: Mar. 20, 2012

(54) METHOD AND SYSTEM FOR FLOW CONTROL WITH ARRAYS OF DUAL BIMORPH SYNTHETIC JET FLUIDIC ACTUATORS

(75) Inventors: Michael Kent Cueman, Niskayuna, NY (US); Seyed Gholamali Saddoughi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1526 days.

(21) Appl. No.: 11/325,063

(22) Filed: Jan. 3, 2006

(65) Prior Publication Data
US 2007/0152104 A1 Jul. 5, 2007

(51) Int. Cl.
*B64C 21/04* (2006.01)
*B64C 21/06* (2006.01)

(52) U.S. Cl. ......... 244/208; 244/204; 244/207; 244/209

(58) Field of Classification Search ................. 244/198, 244/207–209, 204; 114/67 R, 288–290; 239/102.1, 102.2, 265.17, 265.19; 384/1; 138/43, 45, 46; 60/226.1, 231, 770, 264; 415/914

See application file for complete search history.

(56) References Cited

U.S. PATENT DOCUMENTS

| | | | | |
|---|---|---|---|---|
| 3,605,939 A * | 9/1971 | Duthion | ......................... | 181/219 |
| 4,693,201 A * | 9/1987 | Williams et al. | ............. | 114/67 R |
| 5,018,069 A * | 5/1991 | Pettigrew | ......................... | 701/35 |
| 5,613,649 A * | 3/1997 | Schlinker et al. | .............. | 244/1 N |
| 5,957,413 A * | 9/1999 | Glezer et al. | .................. | 244/208 |
| 5,988,522 A * | 11/1999 | Glezer et al. | ..................... | 239/11 |
| 6,302,360 B1 * | 10/2001 | Ng | ................ | 244/203 |
| 6,457,654 B1 * | 10/2002 | Glezer et al. | ....................... | 239/4 |
| 6,722,581 B2 | 4/2004 | Saddoughi | ................ | 239/102.2 |
| 7,255,309 B2 * | 8/2007 | Boldrin et al. | ................ | 244/208 |
| 7,262,545 B2 * | 8/2007 | Takeuchi et al. | .............. | 310/365 |
| 2004/0187474 A1 | 9/2004 | Martens et al. | .................. | 60/204 |

\* cited by examiner

*Primary Examiner* — Tien Dinh
*Assistant Examiner* — Philip J Bonzell
(74) *Attorney, Agent, or Firm* — Scott J. Asmus

(57) ABSTRACT

A system and method for control of a fluid flow. The system includes an array of interdependent fluidic actuators, each including a chamber, a flow control port, and opposite side walls configured to expand apart and contract together to flow a control fluid through the flow control port in response to an input, wherein adjacent actuators in the array of interdependent fluidic actuators are integrally coupled together via a common side wall of the opposite side walls.

12 Claims, 8 Drawing Sheets

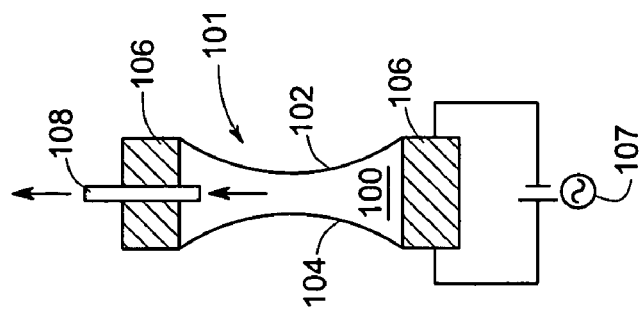
FIG. 8 (PHASE=270°)
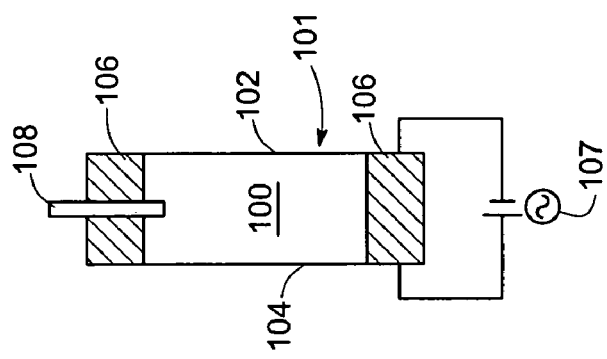
FIG. 7 (PHASE=180°)
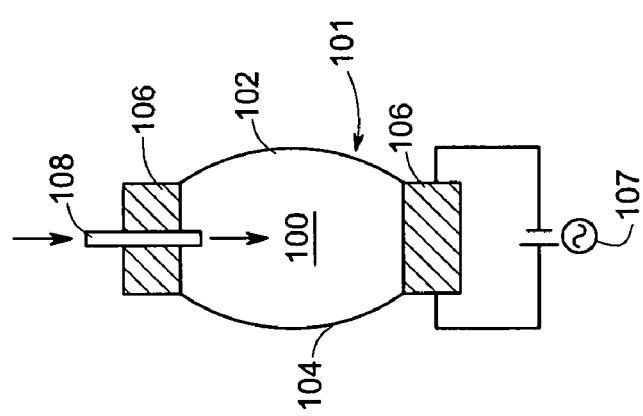
FIG. 6 (PHASE=90°)
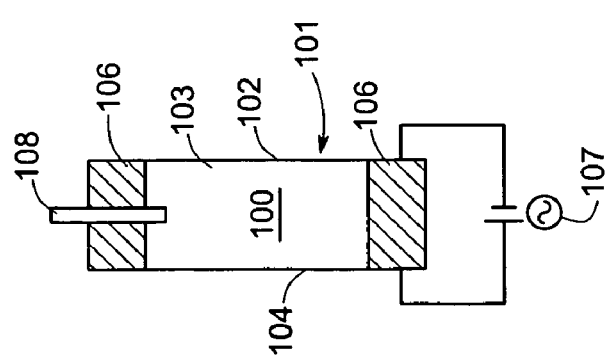
FIG. 5 (PHASE=0°)

METHOD AND SYSTEM FOR FLOW CONTROL WITH ARRAYS OF DUAL BIMORPH SYNTHETIC JET FLUIDIC ACTUATORS

BACKGROUND

This invention relates generally to aerodynamics and active flow control techniques along boundary layers. More specifically, the disclosed embodiments of the invention relate to synthetic jet actuators operated by piezoelectric actuators.

A variety of applications, such as aircraft, include active flow control techniques to improve the aerodynamics and performance. For example, one or more small flow devices may be disposed along a surface of an aerodynamic device, such as an airfoil, to create a small flow or pressure change that modifies the overall flow along the aerodynamic device. These small flow devices generally function independent from one another.

Accordingly, it would be desirable to provide an active flow control system with improved effectiveness and reduced drive energy demands.

BRIEF DESCRIPTION

Briefly, in accordance with one embodiment of the invention, there is provided a system for control of a fluid flow. The system includes an array of interdependent fluidic actuators, each including a chamber, a flow control port, and opposite side walls configured to expand apart and contract together to flow a control fluid through the flow-control port in response to an input. Adjacent actuators in the array of interdependent fluid actuators are integrally coupled together via a common side wall of the opposite side walls.

In accordance with another embodiment of the invention, there is provided a method for manufacturing a system for control of a fluid flow. The method includes providing an array of interdependent fluidic actuators, each comprising a chamber, a flow control port, and opposite side walls. The method also includes integrally coupling together adjacent actuators in the array of interdependent fluidic actuators via a common side wall of the opposite side walls.

In accordance with another embodiment of the invention, there is provided a method for controlling a fluid flow. The method includes oscillating opposite side walls, including shared side walls, of actuators arranged in an array of interdependent fluidic actuators, each comprising a chamber disposed between the opposite side walls and a flow control port pneumatically coupled to the chamber. The method also includes flowing a control fluid through each flow control port in response to an input.

DRAWINGS

These and other features, aspects, and advantages of the present invention will become better understood when the following detailed description is read with reference to the accompanying drawings in which like characters represent like parts throughout the drawings, wherein:

FIG. 5 is a diagrammatical representations of the dual bimorph synthetic jet fluidic actuator as illustrated in FIG. 4, further illustrating a first phase of an operational cycle for active flow control in accordance with an exemplary embodiment of the present technique;

FIG. 6 is a diagrammatical representations of the dual bimorph synthetic jet fluidic actuator as illustrated in FIG. 4, further illustrating a second phase of an operational cycle for active flow control in accordance with an exemplary embodiment of the present technique;

FIG. 7 is a diagrammatical representations of the dual bimorph synthetic jet fluidic actuator as illustrated in FIG. 4, further illustrating a third phase of an operational cycle for active flow control in accordance with an exemplary embodiment of the present technique;

FIG. 8 is a diagrammatical representations of the dual bimorph synthetic jet fluidic actuator as illustrated in FIG. 4, further illustrating a fourth phase of an operational cycle for active flow control in accordance with an exemplary embodiment of the present technique;

Figure 11:
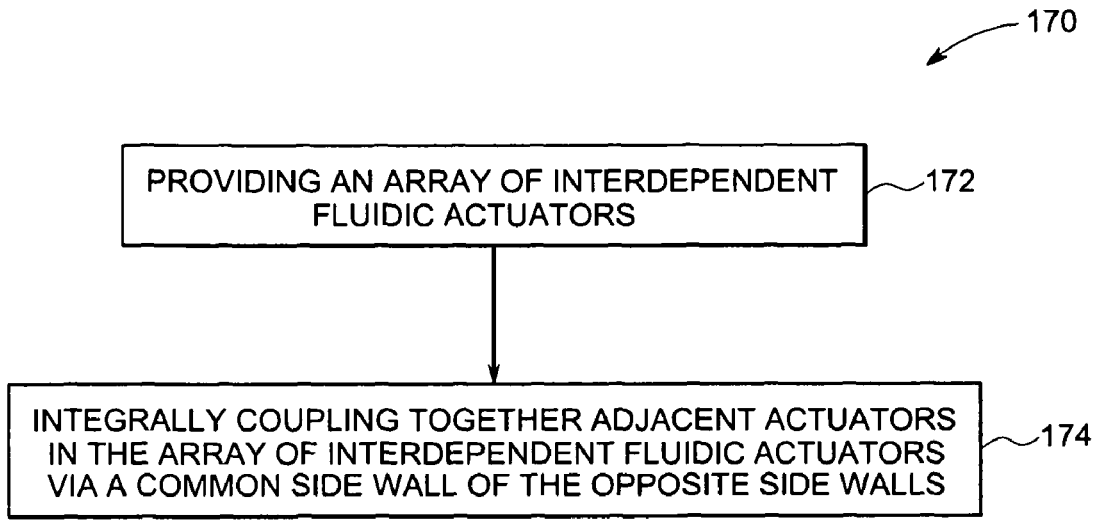
Figure 12:
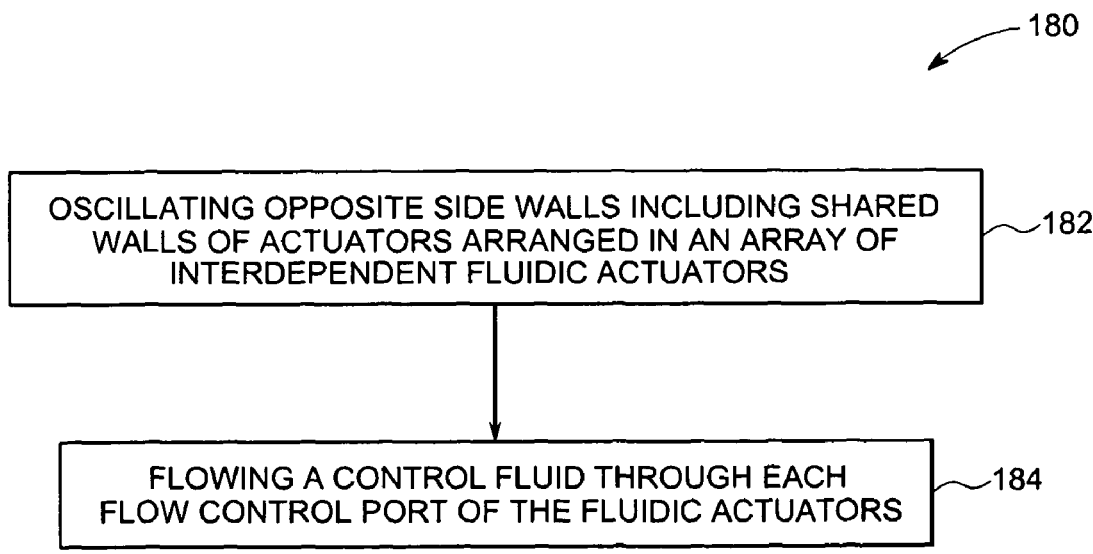

FIG. 11 is a flow chart illustrating an exemplary process of manufacturing a system having a cooperative or interdependent array of dual bimorph synthetic jet fluidic actuators for controlling flow of a fluid in accordance with an exemplary embodiment of the present technique; and FIG. 12 is a flow chart illustrating a process of controlling flow using a cooperative or interdependent array of dual bimorph synthetic jet fluidic actuators in accordance with an exemplary embodiment of the present technique.

DETAILED DESCRIPTION

Figure 1:
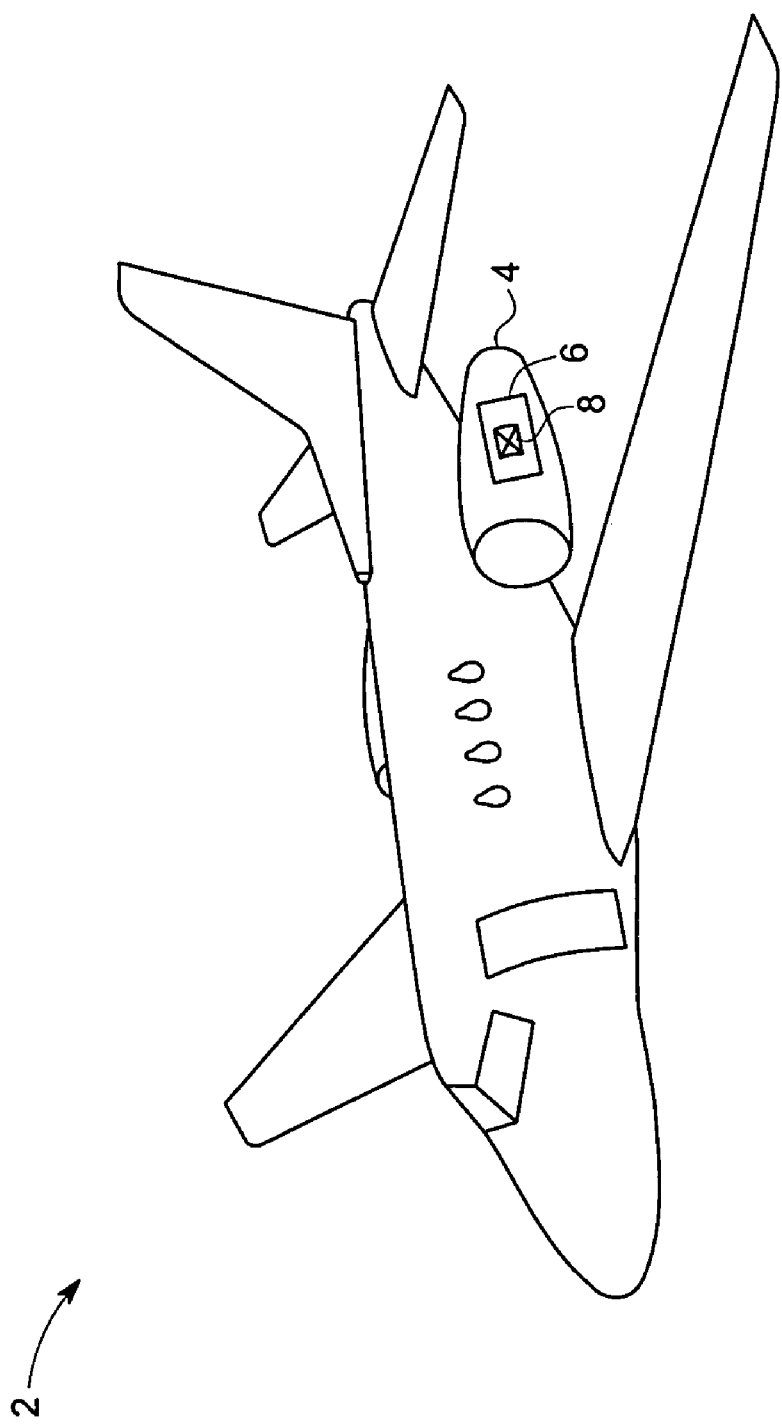
FIG. 1 is a diagrammatical representation of an aircraft having specific flow control features in accordance with an exemplary embodiment of the present technique.

Flow control techniques may be used to improve aerodynamics and general flow performance in a variety of applications, including aircraft engines, aircraft wings, various airfoils, industrial ducts, pneumatic transports, boats, submarines, marine projectiles, various parts of wind turbines such as stalls, lifts, gusts and so forth. FIG. 1 is a diagrammatical representation of an aircraft 2 having specific flow control features in accordance with an exemplary embodiment of the present technique. The aircraft 2 is equipped with a propulsion assembly 4 that includes an aircraft engine 6. The aircraft 2 includes a fluid flow control system 8 configured to control the air pressure, flow, boundary layer behavior, or aerodynamics of the aircraft 2, for example, the aircraft engine 6. As discussed in further detail below, the fluid flow control system 8 includes an array of interdependent fluidic actuators, each having a chamber, a flow control port, and opposite side walls configured to expand apart and contract together to flow a control fluid through the flow control port in response to an input, wherein adjacent actuators in the array of interdependent fluidic actuators are integrally coupled together via a common side wall of the opposite side walls. The common side walls between the interdependent fluidic actuators advantageously increase the output to input ratio, thereby providing a greater amount of flow control for a given input energy. Moreover, the array of interdependent fluidic actuators may be synchronized with one another to provide alternating blowing and sucking pulses.

Figure 2:
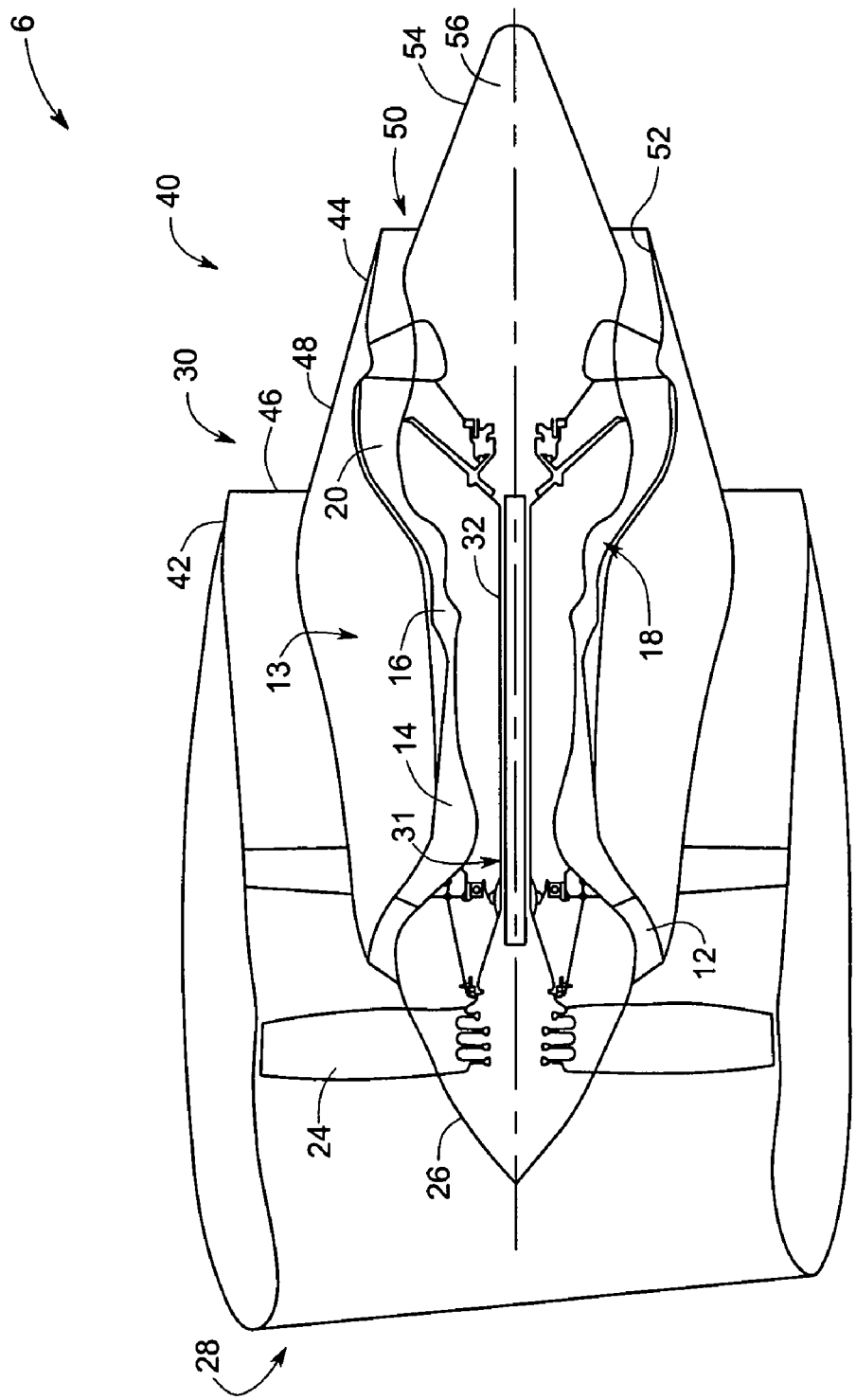
FIG. 2 is a diagrammatical representation of an engine, such as an aircraft engine, having specific flow control features in accordance with an exemplary embodiment of the present technique.

FIG. 2 is a diagrammatical representation of an engine, such as a gas turbine engine 6, having specific flow control features in accordance with an exemplary embodiment of the present technique. Again, an array of interdependent fluidic actuators having common intermediate walls may be disposed at various locations on the gas turbine engine 6. The illustrated gas turbine engine 6 is a detailed view of one embodiment of the aircraft engine 6 shown in FIG. 1. The gas turbine engine 6 includes a fan assembly 12 and a core engine 13 including a high pressure compressor 14, and a combustor 16. Engine 6 also includes a high pressure turbine 18, a low pressure turbine 20, and a booster 22. Fan assembly 12 includes an array of fan blades 24 extending radially outward from a rotor disc 26. Engine 6 has an intake side 28 and an exhaust side 30. Fan assembly 12 and turbine 20 are coupled by a first rotor shaft 31, and compressor 14 and turbine 18 are coupled by a second rotor shaft 32.

An exhaust assembly 40 extends downstream from core engine 13 and includes an annular fan exhaust nozzle 42 that extends around, and is spaced radially outwardly from, a core engine exhaust nozzle 44. More specifically, fan exhaust nozzle 42 is positioned upstream from core exhaust nozzle 44 and is spaced radially outwardly from core exhaust nozzle 44 such that an annular bypass stream outlet 46 is defined between fan exhaust nozzle 42 and engine cowling 48 extending circumferentially around core engine 13.

Core exhaust nozzle 44 also has an annular outlet 50 defined between an inner surface 52 of cowling 48 and an outer surface 54 of a centerbody or center plug 56. In an alternative embodiment, core exhaust nozzle 44 may be a long-ducted mixed flow exhaust and is discharged into stream outlet 46 upstream from centerbody 56, such that core combustion gases are mixed with bypass stream flow prior to the mixture being discharged from exhaust assembly 40. In the exemplary embodiment, centerbody 56 extends aftward from core engine 13 such that core exhaust nozzle outlet 50 is upstream from an aft end 58 of centerbody 56. In an alternative embodiment, centerbody 56 does not extend downstream from nozzle outlet 50, and rather nozzle outlet 50 is downstream from centerbody 56.

During operation, air flows through fan assembly 12 and compressed air is supplied to high pressure compressor 14. The highly compressed air is delivered to combustor 16. Airflow from combustor 16 drives turbines 18 and 20, and turbine 20 drives fan assembly 12 via shaft 31. More specifically, to produce thrust from engine 6, fan discharge flow is discharged through fan exhaust nozzle 42, and core combustion gases are discharged from engine 6 through core engine exhaust nozzle 44. In one embodiment, engine 6 is operated at a relatively high bypass ratio, which is indicative of the amount of fan air, which bypasses core engine 13 and is discharged through fan exhaust nozzle 42. In an alternative embodiment, gas turbine engine 6 is operable with a low bypass ratio. In one embodiment of the invention, the system 8 for controlling flow of a fluid may be located on one or more flow boundary surface(s) such as the outer surface of fan exhaust nozzle 41, the inner surface of fan exhaust nozzle 43, the outer surface of cowling 45, the inner surface of cowling 52, outer surface of center body 54 and the like.

Figure 3:
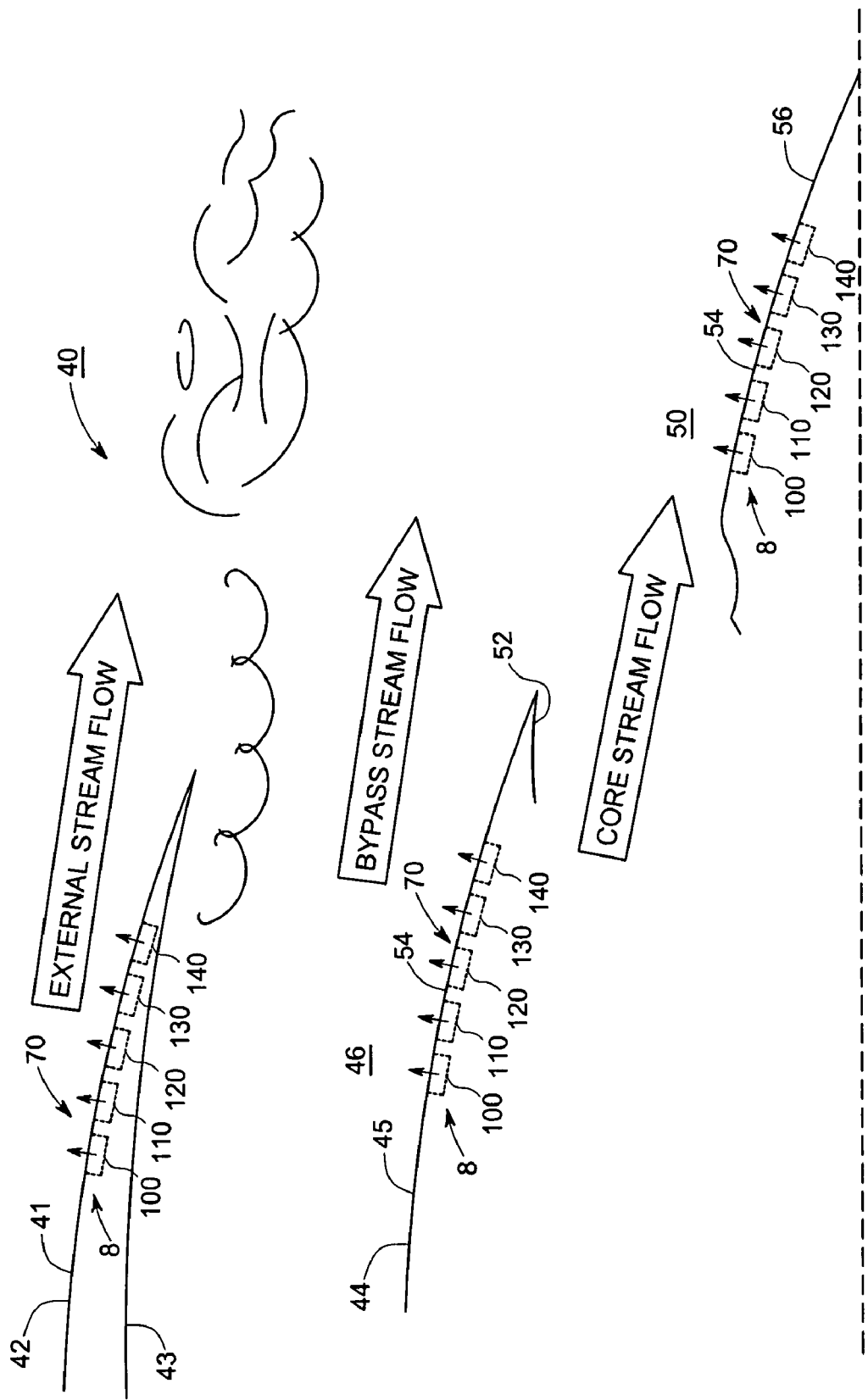
FIG. 3 is a diagrammatical representation of an exemplary deployment configuration of a system for controlling flow of a fluid in an aircraft engine in accordance with an exemplary embodiment of the present technique.

FIG. 3 is a diagrammatical representation of exemplary mounting configurations of the system 8 for controlling flow of a fluid in the engine 6 of FIG. 2 in accordance with an exemplary embodiment of the present technique. System 8 in FIG. 3 is a detailed view of one embodiment of the system 8 shown in FIG. 1. In the exemplary embodiment, fluid flow control system 8 includes an array 70 of interdependent dual bimorph synthetic jet (DBSJ) actuators ("interdependent actuators") 100, 110, 120, 130, and 140 that extends along an exemplary flow boundary surface, such as 41, 43, 52, 54, and 45. In certain embodiments, the array 70 may include a smaller or greater number of the interdependent actuators, for example, 2, 3, 4, 6, 7, 8, 9, 10, or more. The array 70 of interdependent actuators 100, 110, 120, 130, and 140 may be positioned within a structure below the flow boundary surface via a suitable mounting mechanism, as discussed in further detail below. For example, the interdependent actuators 100, 110, 120, 130, and 140 may extend radially inward from an orifice plate attached to the flow boundary surface. Thus, the orifice plate may form a part of the flow boundary surface.

Referring to FIG. 3, fluid flow control system 8 includes a plurality of circumferentially-spaced arrays 70 of the interdependent actuators 100, 110, 120, 130, and 140 mounted in the exhaust assembly 40 of FIG. 2. In one embodiment, interdependent actuators 100, 110, 120, 130, and 140 are spaced circumferentially around bypass stream outlet 46, and as described in more detail below, expel air into bypass stream outlet 46. More specifically, in the exemplary embodiment, interdependent actuators 100, 110, 120, 130, and 140 may be spaced along an inner surface 43 of fan exhaust nozzle 42. Alternatively, interdependent actuators 100, 110, 120, 130, and 140 may be mounted along surface 43 and/or an outer surface 45 of cowling 48. In another embodiment, interdependent actuators 100, 110, 120, 130, and 140 may be spaced circumferentially around core exhaust nozzle outlet 50 and may be mounted along cowling inner surface 52 and/or along centerbody surface 54, and expel air into core exhaust nozzle outlet 50. In a further embodiment, interdependent actuators 100, 110, 120, 130, and 140 may be spaced circumferentially along an outer surface 41 of fan exhaust nozzle 42 and expel air into an external air stream flowing past engine 6.

Structurally, the interdependent actuators 100, 110, 120, 130, and 140 may be piezoelectric devices that function like bellows to create alternating expansion and contraction pulses through fluid outlets or flow control ports. The small pulsating flows of control fluid coming out of the flow control ports of the interdependent actuators 100, 110, 120, 130, and 140 may be designed and utilized to change flow behavior of much larger flows in aerodynamic applications, such as boundary layer control of the larger flows. In one exemplary embodiment, the interdependent actuators 100, 110, 120, 130, and 140 are placed in the array 70 to create a series of fluidic control flow points over a flow boundary surface.

Specifically, the interdependent actuators 100, 110, 120, 130, and 140 expel air at a sufficient magnitude and orientation with respect to the flow they are penetrating as to generate stream-wise vortices. More specifically, in the exemplary embodiment illustrated in FIG. 3, the interdependent actuators 100, 110, 120, 130, and 140 are selectably operable to expel the control fluid into bypass stream outlet 46. The control fluid expelled from the interdependent actuators 100, 110, 120, 130, and 140 facilitates enhanced mixing of fan discharge flow with core exhaust flow exiting core exhaust nozzle 44 and with surrounding ambient fluid flow. The enhanced mixing decreases velocity gradients within the exhaust flow and, in this manner, facilitates control of boundary layer flow during engine operation. However, because the interdependent actuators 100, 110, 120, 130, and 140 are selectably operable in the stream flow during engine operations, the interdependent actuators 100, 110, 120, 130, and 140 do not generate aerodynamic performance losses during flight regimes wherein boundary layer control is not employed. Structure and function of one exemplary synthetic jet actuator 100 is explained in detail to represent the structure and function of all of the interdependent actuators 100, 110, 120, 130, and 140 in the array 70 of system 8.

Figure 4:
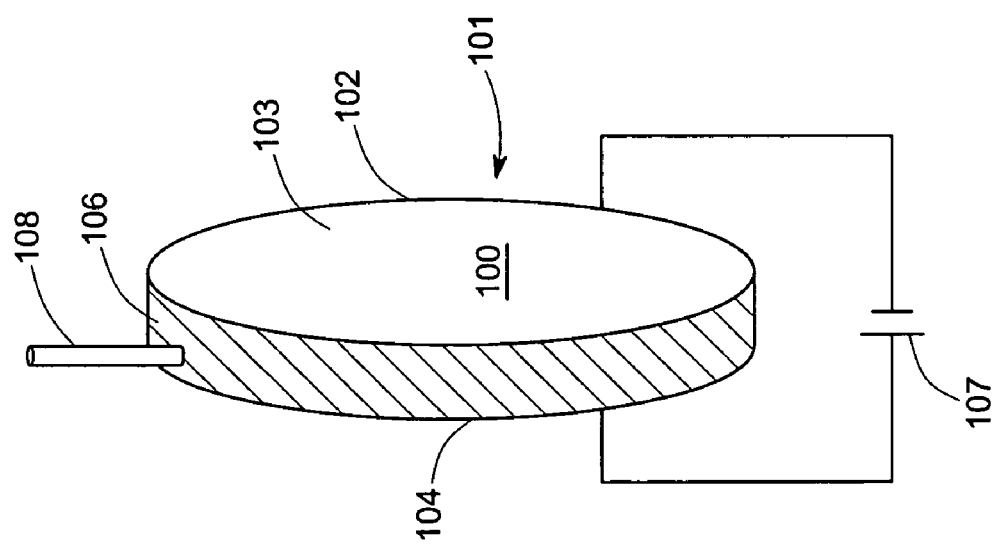
FIG. 4 is a diagrammatical representation of a dual bimorph synthetic jet fluidic actuator that can be integrated into a cooperative or interdependent array of actuators in accordance with an exemplary embodiment of the present technique.

FIG. 4 is a diagrammatical representation of an exemplary synthetic jet fluidic actuator 100 that can be integrated into the cooperative or interdependent array 70 of other actuators 110, 120, 130, and 140 in accordance with an exemplary embodiment of the present technique to control fluid flow in association with operation of the engine 6. Referring to FIG. 4, the actuator 100 includes an actuator body 101, a flow control port 108 and a common source of voltage 107. The actuator body 101 includes a fluidic chamber 103 that is coupled in flow communication with an exemplary flow boundary surface through the flow control port 108. In the exemplary embodiment, actuator body 101 is fabricated from a pair of side walls 102 and 104 that are coupled together by flexible spacer ring 106. Side walls 102 and 104 are spaced apart from each other and in the exemplary embodiment, are substantially parallel. Spacer ring 106 encircles the space defined between the side walls and may overlap a portion of side walls 102 and 104, such that spacer ring 106 holds side walls 102 and 104 together while defining a portion of chamber 103. Spacer ring 106 is constructed from a suitable flexible, fluid-tight material. In one embodiment, spacer ring 106 is fabricated from a material that is suitable as an adhesive, such as, but not limited to a room temperature vulcanizing (RTV) material.

In one embodiment of the invention, the side walls 102 and 104 may be formed from a plurality of generally planar stacked layers. More specifically, each side wall 102 and 104 forms a bimorph piezoelectric structure including two piezoelectric layers having opposite polarities. In the exemplary embodiment, jet actuator 100 includes two side walls 102 and 104, and may be defined as a dual bimorph synthetic jet (DBSJ). In one embodiment, piezoelectric layers are fabricated from a piezoceramic material. Because of the opposite-facing polarities, when a voltage is applied to actuator jet 100, one layer expands while the other layer contracts.

Referring to FIG. 4, source 107 provides an alternating voltage of a predetermined magnitude and frequency to side walls 102 and 104. During operation, voltage from electric source 107 is applied to the side walls 102 and 104 so as to cause side walls 102 and 104 to expand in opposite directions relative to each other. In the exemplary embodiment, the actuation of side walls 102 and 104 and jet actuator 100 is pulsed rather than continuous. In another embodiment, jet actuator 100 is operated continuously. More specifically, when one exemplary side wall 102 is expanded convexly outward, the other opposite side wall 104 will be expanded convexly outward in an opposite direction. The simultaneous expansion of side walls 102 and 104 causes a decreased partial pressure within fluid chamber 103, which in turn causes fluid to enter chamber 103 through a flow control port 108.

In the exemplary embodiment illustrated in FIG. 4, side walls 102 and 104 are substantially circular and since the piezoelectric layers are parallel to each other, applying a voltage causes at least one side wall 102 and 104 to bow and become substantially hemispherical-shaped. More specifically, when a voltage of opposite polarity is applied, side wall 102 and 104 bends in the opposite direction (i.e. becomes concave rather than convex). This arrangement in effect doubles the force exerted for a given voltage compared to a single piezoelectric layer. In the exemplary embodiment, piezoelectric layers may be covered on each side with a thin protective cladding layer to reduce the likelihood of cracking of the piezoelectric layers during operation. In one embodiment, the cladding layer may be fabricated from stainless steel and may be attached to the piezoelectric layers with a suitable adhesive.

In operation, when voltage of opposite polarity is applied, side walls 102 and 104 expand in the opposite direction. This simultaneous expansion reduces the volume of fluid chamber 103 and causes fluid to be expelled through flow control port 108. For example, in one embodiment, actuator 100 produces a jet velocity of approximately 85.4 m/s (280 ft/s) from discharge conduit 112 when a 750 Hz, 150V RMS input signal is applied. In an alternative embodiment, actuator body 101 includes a plurality of flow control ports 108 arranged around a periphery of actuator body 101. The number of flow control ports 108 may be selected according to the physical space available, desired orientation of the ports, and the desired output among other factors. Although the outlet discharge velocity is reduced by adding additional flow control ports 108, the outlet velocity is not reduced in proportion to the number of additional flow control ports 108.

FIG. 5 is a diagrammatical representation of the dual bimorph synthetic jet fluidic actuator 100 as illustrated in FIG. 4, further illustrating a first phase of an operational cycle for active flow control in accordance with an exemplary embodiment of the present technique. The configuration corresponds to the initial position of actuator 100 before the voltage is applied from the source of voltage 107 as denoted by phase angle 0 degree. The side walls 102 and 104 are parallel to each other and the actuator is yet to begin its pumping action.

Continuing, FIG. 6 is a diagrammatical representation of the dual bimorph synthetic jet fluidic actuator 100 as illustrated in FIG. 4, further illustrating a second phase of an operational cycle for active flow control in accordance with an exemplary embodiment of the present technique. This configuration corresponds to the second phase of actuator 100 as denoted by phase angle 90 degrees. When a voltage is applied to the side walls 102 and 104 simultaneously, as in FIG. 6, both the side walls 102 and 104 curve outwardly. The side walls 102 and 104 expand in the opposite direction. This action increases the volume of the fluid chamber 103 and causes a decreased partial pressure in the fluid chamber 103, which in turn causes fluid to enter the fluid chamber 103 through the flow control port 108.

FIG. 7 is a diagrammatical representation of the dual bimorph synthetic jet fluidic actuator 100 as illustrated in FIG. 4, further illustrating a third phase of an operational cycle for active flow control in accordance with an exemplary embodiment of the present technique. This configuration corresponds to the third phase of actuator 100 as denoted by phase angle 180 degrees. When the applied voltage to the side walls 102 and 104 comes to zero, both the side walls 102 and 104 come back to the original configuration of being parallel to each other.

FIG. 8 is a diagrammatical representation of the dual bimorph synthetic jet fluidic actuator 100 as illustrated in FIG. 4, further illustrating a fourth phase of an operational cycle for active flow control in accordance with an exemplary embodiment of the present technique. This configuration corresponds to the fourth phase of actuator 100 as denoted by phase angle 270 degrees. When the applied voltage to the side walls 102 and 104 assumes a full amplitude but opposite in direction to the direction corresponding to FIG. 6, both the side walls 102 and 104 curve inwardly. That is, when the right-hand side wall 102 illustrated in FIG. 4 is expanded convexly to the right, the left-hand side wall 104 is expanded convexly to the left. This simultaneous outward expansion of the side walls 102 and 104 reduces the volume of the fluid chamber 103, causes an increased partial pressure in the fluid chamber 103 and causes fluid to be expelled through the flow control port 108.

Referring to FIGS. 5-8, since each side wall 102 and 104 is a bimorph piezoelectric structure, and there are two side walls, this embodiment of the present invention has four times the capacity of a single piezoelectric device of the same overall dimensions. In one example, a device constructed as described above produced a jet velocity of approximately 85.4 m/s (280 ft/s) when a 750 Hz, 150V RMS input signal was applied.

As an alternative to the arrangement illustrated in FIG. 4, the actuator body 101 may be provided with more than one flow control port 108, for example a plurality of flow control ports 108 may be arranged around the periphery of the actuator body 101. The number of flow control ports 108 may be selected according to the physical space available, desired orientation of the ports, and the desired output among other factors. Although the outlet velocity is reduced by adding additional flow control ports 108, the outlet velocity of the jets is not reduced in proportion to the number of additional flow control ports 108. For example, testing has shown that an actuator body 101 having 6 outlets still produces about 90% of the outlet velocity of the same actuator having a single outlet. In other words, this means that a single actuator body 101 could be used to produce output for a number of flow control ports 108.

Functionally, a synthetic jet can influence the flow over a surface, for example, to control flow separation from an airfoil. The exemplary synthetic jet actuator 100 as illustrated in FIGS. 4-8 includes the two side walls 102 and 104, the spacer ring 106, the internal chamber 103 and the flow control port 108. The synthetic jet actuator 100, in effect constitutes a mechanism for periodically changing the volume within the internal chamber 103 so that a series of fluid vortices are generated and projected in an external environment out from the flow control port 108. Various volume changing mechanisms, for example a piston positioned in the spacer ring 106 may be used to move the fluid in and out of the flow control port 108 during reciprocation of the piston, or a flexible diaphragm as a wall of the spacer ring 106. The flexible diaphragm may be typically actuated by a piezoelectric actuator or other appropriate mechanisms.

Referring again to FIGS. 4-8, the fluid flow control system 8 is typically utilized to create time-harmonic motion of the spacer ring 106. As the side walls 102 and 104 move into the chamber 103, decreasing the chamber volume, fluid is expelled from the chamber 103 through the flow control port 108. As the fluid passes through the flow control port 108, the flow separates at the sharp edges of the flow control port 108 and creates vortex sheets into a larger flow, which roll up into vortices. These vortices move away from the edges of the flow control port 108 under their own self-induced velocity. Again, as the side walls 102 and 104 move outward with respect to the chamber 103, increasing the volume of the chamber 103, ambient fluid is drawn from large distances through the flow control port 108 into the chamber 103. Since the vortices are already removed from the edges of the flow control port 108, they are generally not affected by the ambient fluid being entrained into the chamber 103. As the vortices travel away from the flow control port 108, they synthesize a jet of fluid, a "synthetic jet," through entrainment of the ambient fluid.

Figure 9:
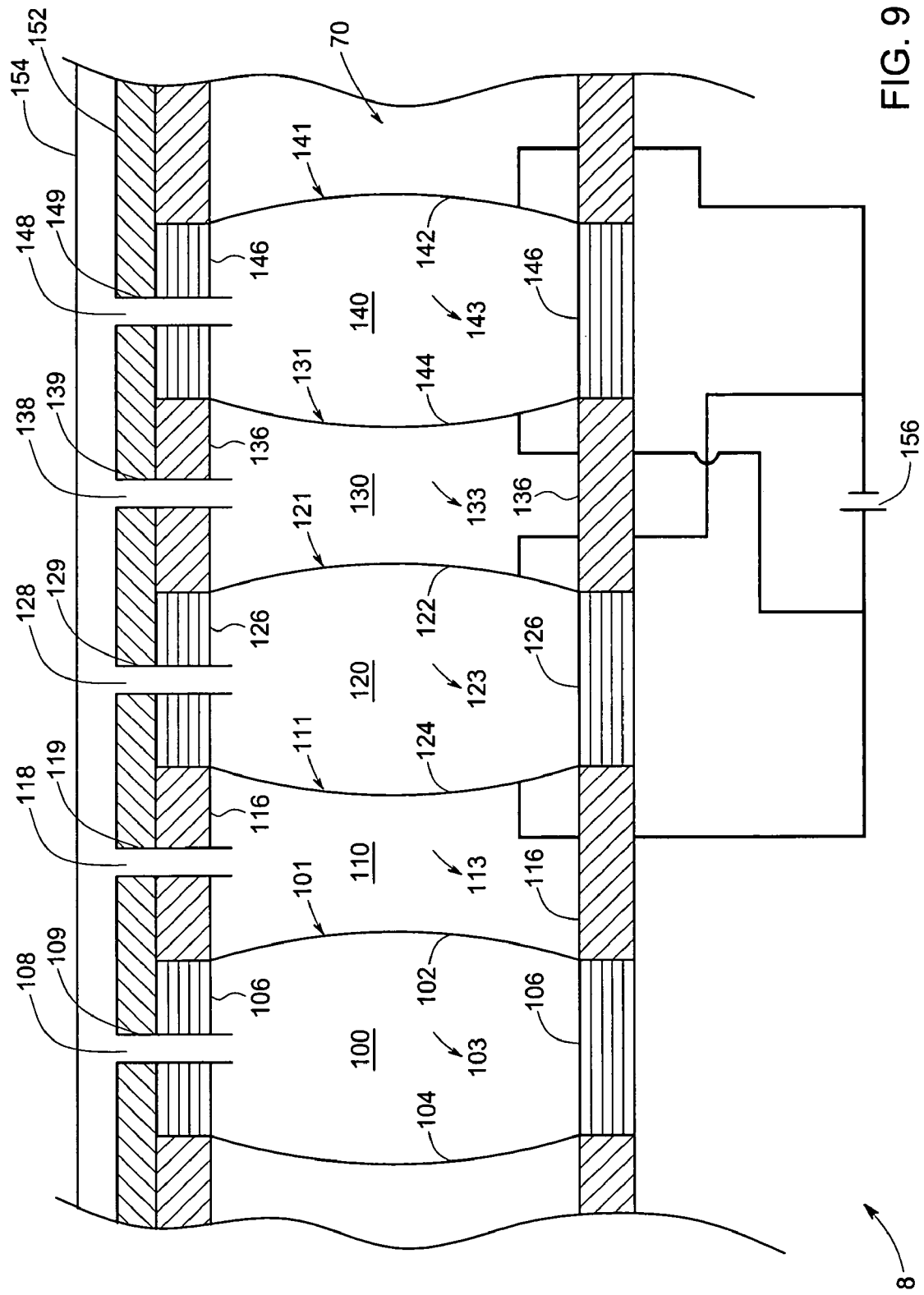
FIG. 9 is a diagrammatical representation of a cooperative or interdependent array of dual bimorph synthetic jet fluidic actuators disposed in alternating contracted and expanded states at a first time in a pulsing cycle for active flow control in accordance with an exemplary embodiment of the present technique.

FIG. 9 is a diagrammatical representation of the fluid control system 8 having a cooperative or interdependent array 70 of the dual bimorph synthetic jet fluidic actuators 100, 110, 120, 130, and 140 disposed in alternating expanded and contracted states at a first time in a pulsing cycle for active flow control in accordance with an exemplary embodiment of the present technique. In the exemplary embodiment, fluid flow control system 8 includes synthetic jet actuators 100, 110, 120, 130, and 140 that extend from exemplary flow boundary surfaces 41, 43, 52, 54, and 45 as mentioned in relation to FIG. 3. The system 8 for control of a fluid flow, includes an array 70 of interdependent fluidic actuators 100, 110, 120, 130, and 140, each including a chamber, a flow control port, and opposite side walls configured to expand apart and contract together to flow a control fluid through the flow control port in response to an input. The adjacent actuators in the array 70 of the interdependent fluid actuators 100, 110, 120, 130, and 140 are integrally coupled together via a common side wall of the opposite side walls as described below.

The array 70 of interdependent actuators 100, 110, 120, 130, and 140 includes a first set of actuators 100, 120 and 140 and a second set of actuators 110 and 130. The actuators 100, 120 and 140 of the first set of actuators and the actuators 110 and 130 of the second set of actuators alternate one after another. Therefore, when viewed from left to right as in FIG. 9, first is actuator 100, followed by actuator 110, followed by actuator 120, followed by actuator 130, followed by actuator 140 and so on. The first set of actuators 100, 120 and 140 includes active control mechanisms configured to move the opposite side walls. On the other hand, the second set of actuators 110 and 130 are passively operated via movement of the opposite side walls by the first set of actuators 100, 120 and 140.

Referring again to FIG. 9, the interdependent actuators 100, 110, 120, 130, and 140 include piezoelectric devices disposed on the opposite side walls about the chambers. Thus, the common sidewalls between the chambers of the adjacent actuators such as side wall 102 between 100 and 110; side wall 124 between 110 and 120; side wall 122 between 120 and 130; side wall 144 between 130 and 140 are configured to oscillate alternately between an expanded and a contracted state as has been described in relation to the structure and operation of exemplary actuator 100 in FIG. 4. Specifically, the opposite side walls including the common side walls of the active actuators 100 and 110 are configured to alternate between inwardly curved and outwardly curved geometries. In this manner, the common side walls 102, 124, 122, 144, 142 and the like induce opposite flows through the flow control ports of the adjacent actuators by virtue of their oscillating movement as will be explained in more details below. In one embodiment of the invention, the first and second sets of actuators are integrally coupled together in an alternating arrangement having the common side wall disposed between the adjacent actuators in the first and second sets.

As further illustrated in FIG. 9, a discharge conduit 152 is connected to all the flow control ports of the actuators. The discharge conduit 152 is disposed below an orifice plate 154 configured to secure the array 70 of interdependent actuators 100, 110, 120, 130, and 140 to a flow boundary surface mentioned in relation to FIG. 3. The discharge conduit 152 is thus connected to the flow control port 108 of the first fluidic actuator 100 to supply the fluid to the first fluidic actuator 100; to the flow control port 118 of the second fluidic actuator 110 to supply the fluid to the second fluidic actuator; to the flow control port 128 of the third fluidic actuator 120 to supply the fluid to the third fluidic actuator, and so on. In operation, when an alternating voltage of a predetermined magnitude and frequency from a common controllable electric source 156 is applied to the side walls of the actuators 100, 120 and 140, periodic expansion and contraction of the side walls of the actuators 100, 120 and 140 cause oscillatory motion of the fluid distributed through the discharge conduit 152 into and out of the actuators 100, 120 and 140 as has been explained earlier in relation to the operation of a single actuator 100 in FIG. 4.

In this configuration, each of the actuators 100, 110, 120, 130, and 140 is interdependent on its neighboring actuator. The side walls 104 and 102 of the active actuator 100 and the side walls 124 and 122 of the active actuator 120 are directly controlled by the alternating voltage source 156. Therefore, the side walls 104, 102, 124 and 122 oscillate symmetrically, and thereby pump fluid from both their inside and outside surfaces. At the same time, the second set of actuators 110 and 130 is interspersed between the first set of active actuators 100, 120 and 140. By way of their connectivity with the active actuators 100, 120 and 140 through the common walls 104, 102, 124, 122 and the spacer rings 116 and 136, the second set of actuators 110 and 130 oscillate in synchronization with and in reverse phase of the active actuators 100, 120 and 140. In this manner, actuators 110 and 130 form additional passive actuators that utilize the space between the active actuators 100, 120 and 140 and also utilize the back surface pumping effect backside pumping of the common walls 104, 102, 124, 122 to harvest the energy from the oscillating fluid.

Referring to FIG. 9, when the side wall 102 and the side wall 104 of the first fluidic actuator 100 are expanded simultaneously in opposite outward directions relative to each other and away from the fluid chamber 103, the side wall 122 and the side wall 124 of the third fluidic actuator 120 are also expanded simultaneously in opposite outward direction relative to each other and away from the fluid chamber 123. This action results in reduced partial pressure within the fluid chambers 103 and 123. At the same time, the partial pressure is increased within the fluid chambers 113 and 133. Consequently, the fluid distributed through the discharge conduit 152 is drawn into the fluid chamber 103 of the fluidic actuator 100 through the flow control port 108. In a like manner, the fluid distributed through the discharge conduit 152 is simultaneously drawn into the fluid chamber 123 of the fluidic actuator 120 through the flow control port 128. At the same time, the fluid distributed through the discharge conduit 152 is simultaneously expelled from the fluid chamber 113 of the fluidic actuator 110 through the flow control port 118; and from the fluid chamber 133 of the fluidic actuator 130 through the flow control port 138. Thus, in the illustrated embodiment, the moving piezoelectric side walls 104, 102, 124, 122 of the array 70 of the actuators 100, 110, 120, 130, and 140 do useful work with both their front and back surfaces and give almost twice the fluidic output for the fluid flow control system 8.

In operation, all the actuators 100, 120 and 140 in the first set of actuators may be synchronized with one another and all the actuators 110 and 130 in the second set of actuators may be synchronized with one another. Moreover, the first set of actuators may be synchronized in an opposite phase from the second set of actuators. In one embodiment of the invention, the frequency of oscillation of the first fluidic actuators and the frequency of oscillation of the second fluidic actuators may be locked with each other. Stating from a control point of view, in one embodiment of the invention, the volumes of the fluidic chambers of the actuators 100, 120 and 140 may be varied individually by design to achieve a desired frequency of oscillation of the fluid. In one embodiment, the volumes of the various fluidic chambers may be same. In another embodiment of the invention, the volumes of the various fluidic chambers may be different.

Referring again to FIG. 9, actuators 100, 110, 120, 130, and 140 are positioned within exemplary flow boundary surfaces 41, 43, 52, 54, and 45 referred to in FIG. 2 such that the actuators 100, 110, 120, 130, and 140 are positioned radially inward from the orifice plate 154. This way, the orifice plate 154 forms at least a portion of the exemplary flow boundary surfaces 41, 43, 52, 54, and 45. In the exemplary embodiment, plate 154 includes a series of orifices 109, 119, 129, 139, and 149 on to secure respectively the actuators 100, 110, 120, 130, and 140 in fluid communication with the flow boundary surfaces 41, 43, 52, 54, and 45. In another embodiment, plate 154 may include an elongated slot rather than a series of openings. It should be noted that the size, shape, number and angular orientation of orifices 109, 119, 129, 139, and 149 with respect to exemplary flow boundary surfaces 41, 43, 52, 54, and 45 is variably selectable to suit a particular application. For example, orifices 109, 119, 129, 139, and 149 may be angularly oriented in a downstream direction (pitch angle), or orifices 109, 119, 129, 139, and 149 may be angularly oriented in the plane of orifice plate 154 (yaw angle).

Figure 10:
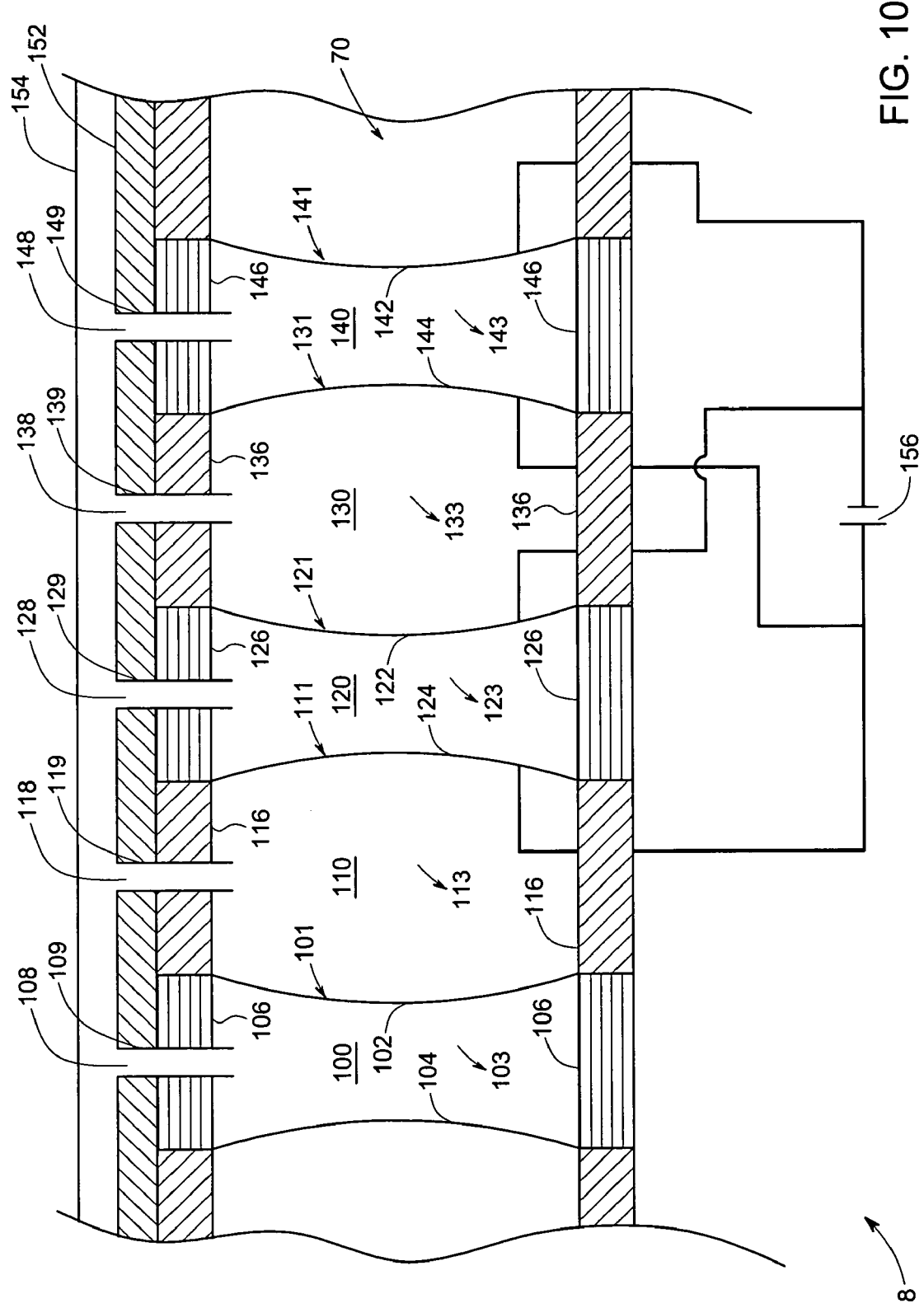
FIG. 10 is a diagrammatical representation of the cooperative or interdependent array of dual bimorph synthetic jet fluidic actuators as illustrated in FIG. 9, wherein the actuators are disposed in alternating expanded and contracted states at a second time in the pulsing cycle for active flow control in accordance with an exemplary embodiment of the present technique.

FIG. 10 is a diagrammatical representation of the cooperative or interdependent array 70 of dual bimorph synthetic jet fluidic actuators as illustrated in FIG. 9, wherein the actuators 100, 110, 120, 130, 140 are disposed in alternating expanded and contracted states at a second time in the pulsing cycle for active flow control in accordance with an exemplary embodiment of the present technique. In this configuration, the direction of the alternating voltage from common source of alternating voltage 156 has been reversed as compared to the configuration illustrated in FIG. 9.

Referring to FIG. 10, when the side wall 102 and the side wall 104 of the first fluidic actuator 100 are contracted simultaneously in opposite inward direction relative to each other and into the fluid chamber 103, the side wall 122 and the side wall 124 of the third fluidic actuator 120 are also contracted simultaneously in opposite inward direction relative to each other and into the fluid chamber 123. This action results is increased partial pressure within the fluid chambers 103 and 23. At the same time, the partial pressure is reduced within the fluid chambers 113 and 133. Consequently, the fluid distributed through the discharge conduit 152 is expelled from the fluid chamber 103 of the fluidic actuator 100 through the flow control port 108. In a like manner, the fluid distributed through the discharge conduit 152 is simultaneously expelled from the fluid chamber 123 of the fluidic actuator 120 through the flow control port 128. At the same time, the fluid distributed through the discharge conduit 152 is simultaneously drawn into the fluid chamber 113 of the fluidic actuator 110 through the flow control port 128; and into the fluid chamber 133 of the fluidic actuator 130 through the flow control port 138.

Thus, in with the illustrated embodiment, the moving piezoelectric side walls 104, 102, 124, 122 of the array 70 of the actuators 100, 110, 120, 130, and 140 do useful work with both their front and back surfaces and give twice the fluidic output for the fluid flow control system 8. In course of time, the alternating actions of expansion and contraction of the common walls 104, 102, 124, 122 of the array 70 of the actuators 100, 110, 120, 130, 140 as illustrated in FIG. 9 and 10 stabilize the flow of the fluid through the control system 8.

Referring to FIG. 9 and FIG. 10, in one exemplary embodiment, each of the orifices 109, 119, 129, 139, and 149 may be arranged with a central opening on the orifice plate 154 and a plurality of side openings disposed on either side of the central opening. Furthermore, each orifice 109, 119, 129, 139, and 149 may have a conical or nozzle-like profile, so that an inlet to each orifice 109, 119, 129, 139, and 149 is larger in diameter than an outlet of each respective orifice. In another embodiment, each orifice 109, 119, 129, 139, and 149 may have a converging-diverging profile. To facilitate channeling airflow, some orifices may be oriented in an opposite flow direction than other orifices, which facilitates increasing a velocity of airflow out of the orifices 109, 119, 129, 139, and 149 and, in turn, facilitates increasing the overall effectiveness of each synthetic jet actuator 100, 110, 120, 130, and 140.

In another embodiment, the fluid control system 8 may include a plurality of discharge conduits 152 arranged around a periphery of the actuator bodies 101, 111, 121, 131, and 141. The number of discharge conduits 152 may be selected according to the physical space available, desired orientation of the ports, and the desired output among other factors. Although the outlet discharge velocity is reduced by adding additional discharge conduits 152, the outlet velocity is not in proportion to the number of additional discharge conduits 152.

The above-described fluid flow control system 8 provides a cost-effective and reliable means for controlling boundary layer flow during selected flight regimes. More specifically, the fluid flow control system 8 includes at least one synthetic jet actuator that is mounted within the exhaust assembly of the engine. The actuator is selectably operable during selected flight regimes to expel air into the exhaust flow to facilitate generating vortices within the flow downstream from the actuator. The vortices enhance mixing of the exhaust flows and facilitate decreasing the velocity of the exhaust flow. As a result, the fluid flow control system facilitates boundary layer control in a cost effective and reliable manner.

FIG. 11 is a flow chart illustrating an exemplary method 170 of manufacturing a system having a cooperative or interdependent array 70 of dual bimorph synthetic jet fluidic actuators for controlling flow of a fluid in accordance with an exemplary embodiment of the present technique. In accordance with method 170, an array of interdependent fluidic actuators is provided as in step 172. Each actuator in the array of interdependent fluidic actuators includes a chamber, a flow control port, and opposite side walls. Continuing, the adjacent actuators in the array of interdependent fluid actuators are integrally coupled together via a common side wall of the opposite side walls as in step 174.

FIG. 12 is a flow chart illustrating a method 180 of controlling flow using a cooperative or interdependent array 70 of dual bimorph synthetic jet fluidic actuators in accordance with an exemplary embodiment of the present technique. In accordance with method 180, opposite side walls, including shared side walls, of actuators arranged in an array of interdependent fluidic actuators are oscillated as in step 182. Each actuator in the array of interdependent fluidic actuators includes a chamber disposed between the opposite side walls and a flow control port pneumatically coupled to the chamber. In the next step, a control fluid is flown through each flow control port in response to an input as in step 186.

Exemplary embodiments of fluid control systems and exhaust assemblies are described above in detail. The fluid control system assemblies are not limited to the specific embodiments described herein, but rather, components of each assembly may be utilized independently and separately from other components described herein. In one embodiment of the invention, the array 70 of interdependent fluidic actuators 100, 110, 120, 130, and 140 may be disposed along an aerodynamic surface. In another embodiment of the invention, the array may be disposed on an engine, an airfoil, an aircraft, a duct, a watercraft, an automobile, or combinations thereof. In one embodiment of the invention, the input voltage may be a pulsed alternating voltage. In another embodiment of the invention, the input voltage may be a continuous alternating voltage. In one embodiment of the invention, the control fluid may be air. In one embodiment of the invention, the control fluid flowing through the first set of actuators and the second set of actuators may be same. In another embodiment of the invention, the control fluid flowing through the first set of actuators may be different from the control fluid flowing through the second set of actuators.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for control of a fluid flow, comprising:
an array of interdependent fluidic actuators, each comprising a chamber, a flow control port, and opposite side walls configured to expand apart and contract together to flow a control fluid through the flow control port in response to an input, wherein adjacent actuators in the array of interdependent fluidic actuators are integrally coupled together via a common side wall of the opposite side walls.

2. The system according to claim 1, wherein the array of interdependent actuators comprise first and second sets of actuators alternating one after another, the first set of actuators includes active control mechanisms configured to move the opposite side walls, and the second set of actuators are passively operative via movement of the opposite side walls by the first set of actuators.

3. The system according to claim 1, wherein the common side wall is configured to move alternately between the chambers of the adjacent actuators.

4. The system according to claim 1, wherein the common side wall is configured to induce opposite flows through the flow control ports of the adjacent actuators.

5. The system according to claim 1, wherein the opposite side walls including the common side wall are configured to alternate between inwardly curved and outwardly curved geometries.

6. The system according to claim 1, wherein the interdependent fluidic actuators comprise piezoelectric devices disposed on the opposite side walls about the chambers.

7. The system according to claim 1, wherein the array of interdependent fluidic actuators is disposed along an aerodynamic surface.

8. The system according to claim 1, wherein the array is disposed on an engine, an airfoil, an aircraft, a duct, a watercraft, an automobile, or combinations thereof.

9. The system according to claim 1, wherein the input comprises an alternating voltage that is either pulsed or continuous.

10. The system according to claim 1, wherein the array of interdependent fluidic actuators comprise a first set of actuators synchronized with one another and a second set of actuators synchronized with one another in an opposite phase from the first set, and the first and second sets are integrally coupled together in an alternating arrangement having the common side wall disposed between the adjacent actuators in the first and second sets.

11. An aircraft, comprising:
an aircraft body;
a core engine coupled to the aircraft body;
a system configured to control a flow of a fluid associated with the aircraft, comprising an array of interdependent fluidic actuators, each comprising a chamber, a flow control port, and opposite side walls configured to expand apart and contract together to flow a control fluid through the flow control port in response to an input, wherein adjacent actuators in the array of interdependent fluidic actuators are integrally coupled together via a common side wall of the opposite side walls.

12. An engine, comprising:
a core engine;
a system for control of a flow of a fluid associated with the engine, comprising an array of interdependent fluidic actuators, each comprising a chamber, a flow control port, and opposite side walls configured to expand apart and contract together to flow a control fluid through the flow control port in response to an input, wherein adjacent actuators in the array of interdependent fluidic actuators are integrally coupled together via a common side wall of the opposite side walls.

\* \* \* \* \*